INVENTOR
DONALD R. VANDER MOLEN
BY Hofgren, Wegner, Allen,
Stellman & McCord.
ATTORNEYS.

3,445,725
SOLID STATE LOCK-OUT CIRCUIT FOR COMPRESSOR
Donald R. Vander Molen, Stevensville, Mich., assignor to Whirlpool Corporation, a corporation of Delaware
Filed Feb. 2, 1967, Ser. No. 613,502
Int. Cl. H02h 7/06, 7/08, 5/00
U.S. Cl. 317—13                                    13 Claims

ABSTRACT OF THE DISCLOSURE

A solid state control circuit for disabling a motor having an internal protective switch. A transistor shunts an RC time delay circuit when the motor protective switch is closed, and permits operation of the RC time delay circuit when the protective switch is open. A silicon controlled rectifier (SCR) receives a signal from the RC time delay circuit when the circuit is permitted to operate, which signal gates the SCR to deenergize a relay having switch contacts controlling the operation of the motor.

Summary of the invention

This invention relates to motor controls and in particular to motor controls utilizing an internal protective switch.

One conventional form of motor control comprises an internal protective switch connected to the motor windings so as to open the circuit to the motor in the event of a high current or temperature condition. The peresent invention comprehends an improved control for association with such an overload protected motor to provide an improved automatically controlled functioning of the motor. Thus, a principal feature of the present invention is the provision of a new and improved motor control.

Another feature of the invention is the provision of such a motor control having new and improved means for automatically controlling the operation of a motor having an internal protective switch.

Still another feature of the invention is the provision of such a motor control having new and improved means permitting reenergization of the motor in the event that the protective switch causes a single short term deenergization of the motor.

A further feature of the invention is the provision of such a motor control requiring two successive deenergizations of the motor by the protective switch to effect a shutdown of the motor.

Another feature of the invention is the provision of such a motor control including selectively closable switch means for connecting the motor through the protective switch to a power supply, electromagnetic means including a coil for operating the switch means, means for electrically energizing the coil, and solid state control means including electronic time delay means responsive to an opening of the protective switch for a preselected time the switch means is closed for discontinuing energization of the coil by the energizing means and thereby causing the electromagnetic means to operate the switch means to discontinue operation of the motor.

Other features and advantages of the invention will be apparent from the following description taken in connection with the accompanying drawing wherein.

Detailed description

Figure 1:
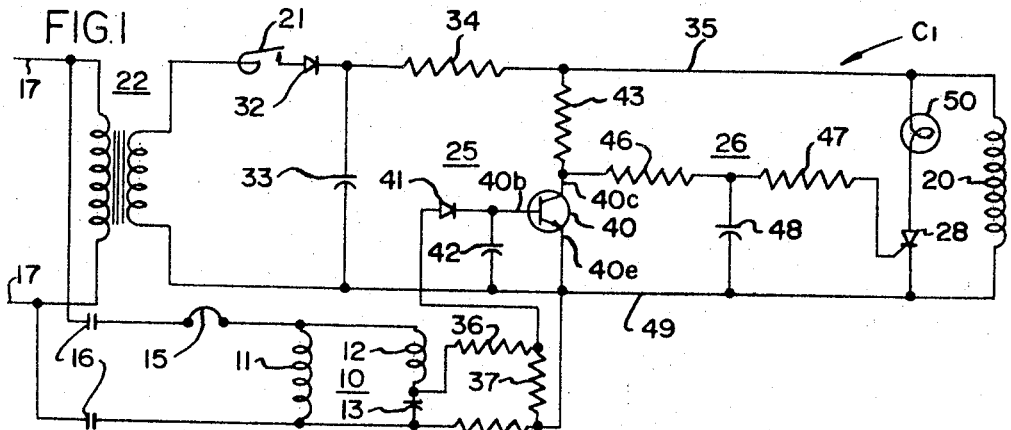
FIGURE 1 is a schematic wiring diagram of a control circuit embodying the invention.

Three exemplary embodiments of the invention are disclosed herein of circuits for controlling the energization of a compressor motor 10. In each circuit, motor 10, composed of a motor run winding 11 in parallel with a series connected motor start winding 12 and a run capacitor 13, is connected through an internal protective switch 15 and selectively closable relay contacts 16 to a pair of energizing leads 17 connected to a suitable source of A.C. voltage (not shown). Internal switch 15 is temperature responsive and is effective to open circuit the series energizing input for the motor windings upon sensing of a high temperature due to electrical or mechanical malfunction of the compressor. As is conventional with internal protective switches for compressor motor circuits, which, like switch 15, are usually mounted internally within the compressor motor housing.

Relay contacts 16 are controlled by the energization of a relay coil 20 which is connected through a thermostatic switch 21 to a transformer 22 which is energized via leads 17. When thermostatic switch 21 closes, coil 20 is energized, causing contacts 16 to close to connect the power supply to compressor motor 10. During the time thermostatic switch 21 is closed, a compressor malfunction causing high temperature within the compressor housing will be sensed by protective switch 15, causing it to open, breaking the connection to the motor 10. After the internal protective switch 15 cools and resets itself, closing the circuit, motor 10 will restart and continue to operate as long as thermostatic switch 21 and protective switch 15 remain closed.

Protective switch 15 may be actuated for a short period of time by a momentary overload condition which is not serious, such as the current surge which occurs when motor 10 is initially energized. The actuation of switch 15 for a longer period of time, however, may indicate a serious compressor malfunction which requires the operator's attention. Similarly, two or more momentary overloads during a relatively short time interval may indicate a serious compressor malfunction which also justifies a shut down of the compressor. To this end when a serious malfunction occurs, the control circuit of the present invention locks out motor 10, preventing its further energization even though protective switch 15 subsequently resets itself.

For this purpose, a solid state control 25 including an electronic time delay network 26 is responsive to an opening of protective switch 15 for a preselected time to discontinue the energization of coil 20. The deenergization of coil 20 in turn opens contacts 16, thereby preventing motor 10 from being reenergized when protective switch 15 automatically resets itself.

In the exemplary circuit $C_1$ of FIGURE 1, a normally nonconductive device, herein a silicon controlled rectifier, or SCR, 28 is actuated by a signal from time delay network 26 when a malfunction exists for a predetermined time, thereby gating SCR device 28 into its conductive state. SCR 28 shunts relay col 20 at this time, dropping the voltage thereacross to a low value which is insufficient to maintain the relay contacts 16 in closed condition. As a result, relay contacts 16 open, open circuiting the motor supply circuit. In the circuit $C_2$ of FIGURE 2, the deenergization part of the circuit for relay coil 20 is modified somewhat, in that the actuation of device 28 causes a normally conductive device 29 in series with coil 20 to be shut off, thereby deenergizing coil 20 and similarly causing relay contacts 16 to open.

In some situations, the single occurrence of a malfunction while thermostatic switch 21 remains closed may not indicate a serious condition. The circuit $C_3$ of FIGURE 3 drives device 29 nonconductive only after a predetermined number of malfunction indications occur. In the representative embodiment illustrated, the second malfunction indication occurring before thermostatic switch 21 is opened drives device 29 nonconductive. If, for example, thermostatic switch 21 was opened after the first malfunction indication was registered, the circuit would automatically reset itself. Thus, a plurality of malfunction indications must occur during the time period while thermostat 21 remains closed before compressor motor 10 will be locked out from further operation. In each of the circuits shown, the control circuit is reset to its initial starting condition when thermostat 21 is opened. Therefore, the manual opening and closing of thermostat 21 disconnects the lockout circuit and allows normal operation to again be initiated.

Turning in detail to FIGURE 1, the circuit $C_1$ provides a D.C. power source for controlling the energization of coil 20 and control means 25. The D.C. source consists of a diode 32, capacitor 33, and a resistor 34 connected as a half-wave rectifier across transformer 22. The rectified D.C. voltage is coupled through a line 35 to coil 20.

Run capacitor 13 is shunted by a voltage divider consisting of series resistors 36, 37 and 38, which forms a part of solid state control means 25. The voltage across resistor 37 is used to bias an NPN transistor 40 which is normally maintained in its saturated condition while compressor motor 10 is operating. More particularly, the junction of resistors 36 and 37 is connected through a diode 41 to the base electrode of transistor 40. The junction of resistors 37 and 38 is directly connected to the emitter 40e of transistor 40. A capacitor 42 shunts the base-emitter junction. The collector 40c of transistor 40 is connected through a resistor 43 to line 35. In operation, the A.C. voltage across capacitor 13 while motor 10 is operating is rectified by diode 41 and produces a sufficient positive potential across capacitor 42 to maintain transistor 40 in its fully conductive or saturated condition.

Delay network 26 is in circuit between the normally nonconductive SCR device 28 and transistor 40. More particularly, resistors 46 and 47 are connected in series between the collector 40c of transistor 40 and the gate of SCR 28. A capacitor 48 is connected between the junction of resistors 46 and 47, and a line 49 connecting the emitter 40e of transistor 40 with the cathode of SCR 28. The anode of SCR device 28 is connected through a light bulb 50 to the positive voltage on line 35.

While transistor 40 remains conductive, it shunts capacitor 48 and prevents a sufficient signal from reaching the gate of SCR device 28. When protective switch 15 opens momentarily, the voltage across capacitor 13 drops to zero, preventing capacitor 42 from being charged through diode 41. The positive charge previously stored by capacitor 42 quickly dissipates through the base-emitter junction of transistor 40, removing the forward bias and causing the transistor to become nonconductive. The voltage at the junction of resistors 43 and 46, which has been maintained at a low value by the conducting transistor, now quickly rises toward the positive potential at line 35. This voltage charges capacitor 48 exponentially. When a sufficient charge is available, SCR device 28 is triggered into its conductive state, shunting the relay coil 20 and causing the relay contacts 16 to open. At the same time, light bulb 50 is energized to visually indicate to an operator the actuation of the lockout circuit.

If an overload condition should terminate before time delay network 26 has passed the signal coupled thereto, the resetting of switch 15 forwardly biases transistor 40, shunting the charge which has accumulated on capacitor 48, and preventing SCR 28 from being fired. It will, therefore, be apparent that the actuation of the lockout circuit depends on the occurrence of a malfunction indication for longer than a preselected minimum length of time. Once SCR device 28 is fired, it remains conducting as long as its anode potential is more positive than its cathode potential, which condition continues until thermostatic switch 21 is opened.

The length of time delay provided by network 26 is determined by the resistance of resistors 46 and 47, the capacitance of capacitor 48, and the gate to cathode resistance of nonconducting SCR device 28. The maximum time delay for this circuit occurs when the value of resistor 46 is equal to the combined values of resistor 47 and the internal gate to cathode resistance of SCR 28. The internal gate-to-cathode resistance of an SCR is of comparatively low value. Resistor 47, therefore, serves the important function of allowing the resistance of this branch of the circuit to be made equal to resistor 46, thereby effectively maximizing the amount of time delay. Considered in another sense, resistor 47 allows capacitor 48 to have a smaller value than would otherwise be necessary. The resistance which is the sum of resistors 46, 47 and the internal resistance of SCR device 28 is determined by the required trigger current of the SCR and the total amount of potential available from the power supply. By selecting SCR's with lower trigger current requirements, larger resistors may be used and thus longer time delays may be achieved when desired. Time delays of several seconds are practical with this circuit.

While relay coil 20 has been illustrated as controlling only contacts 16 in the motor compressor circuit, it will, of course, be apparent that further contacts, either of the normally open or normally closed type, may be provided for controlling other apparatus associated with the compressor. Additional relay coils or control circuits also may be placed in parallel with relay coil 20. In this manner, if desired, by use of the present invention the occurrence of a lockout condition can shut down, or operate, other apparatus in addition to shutting down the compressor motor.

Figure 2:
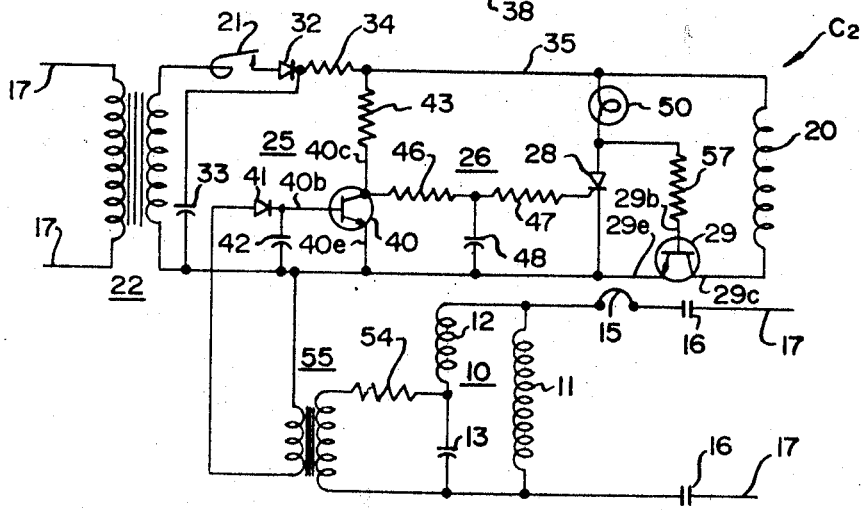
FIGURE 2 is a schematic wiring diagram of a modified form of control circuit embodying the invention.

The exemplary circuit $C_2$ of FIGURE 2 operates generally in the same manner as circuit $C_1$. However, in place of the voltage divider network across run capacitor 13 of circuit $C_1$, in circuit $C_2$ a resistor 54 and transformer 55 couple the A.C. source to diode 41. When the A.C. source voltage applied to motor 10 is interrupted, the A.C. signal to the diode is interrupted in the same manner as was previously described, causing transistor 40 to cease conduction.

In addition to the above change, circuit $C_2$ has been modified in one other manner. Instead of SCR 28 directly shunting coil 20, the collector 29c and emitter 29e electrodes of an NPN transistor 29 are connected in series with coil 20. The base 29b of transistor 29 is connected through a resistor 57 to the junction between light bulb 50 and SCR 28. Transistor 29 is normally maintained in its saturated state by the forward bias available through light bulb 50 and resistor 57. Since the total amount of current drain through resistor 57 and the base-emitter junction is small, light bulb 50 is not at this time sufficiently energized to produce a visible output. When SCR 28 is fired, as previously described, the base-emitter junction of transistor 29 is shunted, causing the transistor to become nonconductive and in turn effectively open-circuiting relay coil 20.

Figure 3:
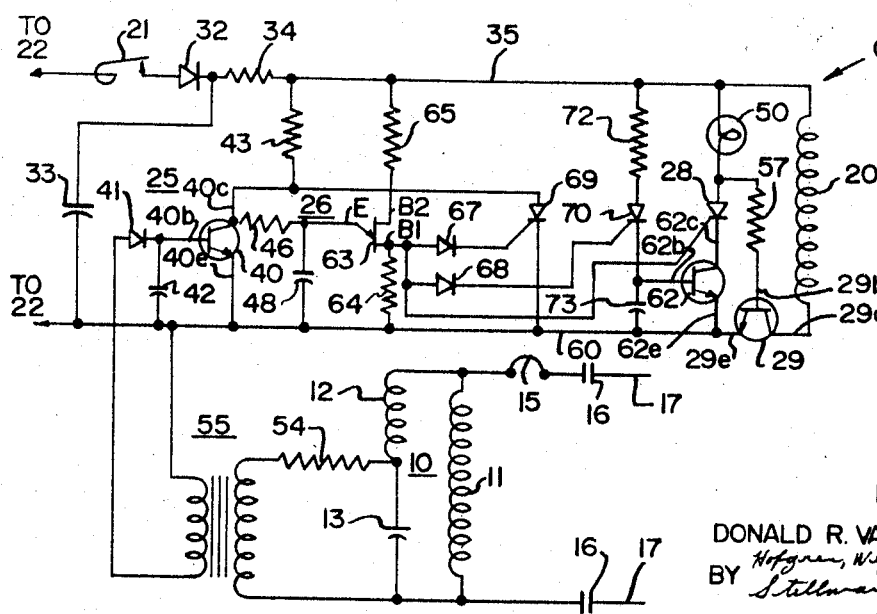
FIGURE 3 is a schematic wiring diagram of a further modified form of control circuit embodying the invention.

In the illustrative circuit $C_3$ of FIGURE 3, two failures sensed by internal protective switch 15 are required to shut the system down. The cathode of SCR 28 is connected to line 60 through the collector 62c and emitter 62e electrodes of a normally nonconducting NPN transistor 62. The first occurrence of a signal at the delay network 26 causes transistor 62 to be switched from its nonconducting to its conducting state. On the occurrence of the second signal at network 26, SCR device 28 is fired to complete a path to line 60, thereby shunting the base-emitter junction of transistor 29 to open circuit coil 20.

More particularly, the junction of resistor 46 and capacitor 48 in delay network 26 is directly connected to the emitter E of a unijunction transistor 63. The B1 electrode of this transistor is coupled through a resistor 64 to line 60, while the B2 electrode is coupled through a resistor 65 to the positive potential on line 35. The resistor 47 used in the prior figures has been eliminated from network 26 in FIGURE 3.

The B1 electrode of unijunction transistor 63 is also coupled directly to the gate of SCR 28, and through diodes 67 and 68 to the gates of SCR devices 69 and 70, respectively. The anode and cathode electrodes of SCR device 69 directly shunt the collector 40c and emitter 40e electrodes of transistor 40. The anode of SCR device 70 is connected through a resistor 72 to line 35, while the cathode is connected through a capacitor 73 to line 60.

The operation of the circuit $C_3$ is as follows. When thermostatic switch 21 is first closed, transistor 40 conducts and shorts capacitor 48, as previously explained. Therefore, the potential at the emitter E electrode of unijunction transistor 63 is insufficient to trigger the device into conduction. As a result, the B1 electrode is at the potential of line 60, and hence SCR devices 28, 69 and 70 remain nonconductive. Since SCR 70 is off, capacitor 73 has no charge thereacross, and transistor 62 is similarly nonconductive at this time.

When protective switch 15 first opens, transistor 40 is driven off, causing the potential across capacitor 48 to rise until unijunction transistor 63 is driven on. The voltage gated through the unijunction transistor tends to forward bias the gate of SCR devices 28, 69 and 70. However, SCR device 28 does not conduct since its cathode is open circuited by non-conducting transistor 62. The triggering of SCR 70 puts gate current into transistor 62, however capacitor 73 delays the establishment of this gate current for a sufficiently long period of time to allow the triggering pulse from unijunction transistor 63 to disappear. By the time transistor 62 is driven on, the pulse at SCR device 28 has already disappeared, preventing SCR 28 from being driven on. SCR 70 will, however, remain conducting since a current flow path exists from line 35, through resistor 72, the anode and cathode electrodes of the SCR, and the base-emitter electrodes of transistor 62. In summary, the first occurrence of an overload triggers and maintains SCR devices 69 and 70 and transistor 62 in a conducting state, the remaining portions of the circuit being turned off after the disappearance of the triggering pulse from unijunction 63. Diodes 67 and 68 are isolation devices which prevent the conduction drop of SCR devices 69 and 70 from turning on SCR device 28.

When internal protective switch 15 finally resets itself, the compressor motor 10 resumes running. This couples a signal to transistor 40, causing it to conduct and thereby extinguish the conduction of SCR 69 by shunting the anode-cathode electrodes thereof.

When a second failure occurs, unijunction transistor 63 is again triggered, firing each of the SCR devices 28, 69 and 70. SCR device 70 is not affected at this time as it is already conducting. However, SCR device 28 now conducts through its anode-cathode and transistor 62, the base-emitter junction of which was energized by the previous failure. As a result, transistor 29 is shunted and turned off, effectively open circuiting relay coil 20.

If a single overload failure had occurred and thermostatic switch 21 had thereafter opened, the system would have returned to its original state, since the conduction of SCR devices 69, 70 and transistor 62 would be extinguished. Thus, the count would be reset to zero and the next occurrence of a failure would not open circuit the energizing path for coil 20. While thermostatic switch 21 remains closed only two successive failures will activate the lockout circuit.

Each of the above described embodiments of the invention provides a solid state motor control circuit for precluding operation of a motor when a malfunction of the motor causes an internal protective switch to open and remain open for a predetermined time interval. The control circuits are described in connection with a compressor motor, wherein a mechanical malfunction of the compressor may also cause the protective switch to open. In addition, each of the control circuits is provided with means for resetting the circuit after the motor has been disabled. Herein the resetting means is a thermostat switch which may be manually opened to deenergize the control circuit. The thermostat switch may then be manually reclosed to again energize the control circuit, but in a reset condition wherein the motor is permitted to function. Such manual reset means is desirable wherein, for example, the compressor malfunction which caused the compressor motor to be disabled was of a temporary nature such as a power source fluctuation or a start under high load conditions due to refrigerant loading of the compressor.

While I have shown and described certain embodiments of my invention, it is to be understood that it is capable of many modifications.

The embodiments of the invention in which an exclusive property or privilege is claimed are defined as follows:

1. In an electrical apparatus including a compressor motor provided with a protective switch connected in series relation with the motor for breaking a connection to said motor in the event of a malfunctioning of said apparatus, means responsive to operation of the protective switch for controlling the energization of the motor comprising:
   switch means for connecting the motor through said protective switch to a power supply;
   electromagnetic means including a coil for operating said switch means;
   means for electrically energizing said coil; and
   solid state control means including electronic time delay means responsive to an opening of said protective switch for a preselected time while said switch means is closed for discontinuing energization of said coil by said energizing means and thereby causing said electromagnetic means to operate said switch means to discontinue operation of the compressor motor.

2. In an electrical apparatus as claimed in claim 1 wherein said means for discontinuing energization of said coil comprises a silicon controlled rectifier connected in parallel with said coil and said time delay means includes means for preventing current flow through said silicon controlled rectifier until said protective switch is open for said preselected time and then permitting current flow therethrough to effectively short out said coil.

3. In an electrical apparatus as claimed in claim 2 wherein said time delay means comprises means for applying a voltage to the gate of said silicon controlled rectifier after said protective switch is open for said preselected time and means for shorting out said voltage applying means when said switch means and said protective switch are closed.

4. In an electrical apparatus as claimed in claim 3 wherein said means for shorting out said voltage applying means comprises a transistor connected in parallel with said time delay means and means responsive to a closed condition of said switch means and said protective switch to maintain said transistor in a saturated state.

5. In an electrical apparatus as claimed in claim 1 wherein said means for discontinuing energization of said coil comprises a transistor connected in series with said coil and means responsive to a closed condition of said switch means and said protective switch to maintain said transistor in a saturated state.

6. In an electrical apparatus as claimed in claim 5 wherein the base of said transistor is connected in series with a signal lamp and a current limiting resistor whereby said signal lamp is unilluminated by current flow through the series connector thereof, said resistor and said transistor.

7. In an electrical apparatus as claimed in claim 5 wherein a silicon controlled rectifier is connected in parallel with said transistor between the base and emitter thereof and said time delay means includes means for preventing current flow through said rectifier until said protective switch is open for said preselected time and then permitting current flow therethrough to decrease the current flow through said transistor from the base to the emitter to cause said transistor to become unsaturated and reduce the current flow to said coil to below that necessary to maintain the connection of the motor to the power supply by said switch means.

8. In an electrical apparatus as claimed in claim 1 wherein said solid state control means includes means for permitting operation of said time delay means to discontinue energization of said coil only when said protective switch opens at least twice while said switch means remains closed.

9. In an electrical apparatus as claimed in claim 8 wherein said solid state control means includes a unijunction transistor means for providing a control pulse as a result of an opening of said protective switch for said preselected time, and means responsive to at least two pulses from said unijunction transistor for opening said switch means.

10. In an electrical apparatus as claimed in claim 8 wherein said control means includes reset means arranged to require two further openings of said protective switch to discontinue energization of said coil in the event said switch means is opened prior to at least two openings of said protective switch.

11. In an electrical apparatus as claimed in claim 10 wherein said reset control means includes means for deactivating said pulse causing means when said control means discontinues energization of said coil.

12. In an electrical apparatus as claimed in claim 1 including reset switch means for deenergizing said solid state control means to thereby reset said electronic time delay means.

13. In an electrical apparatus as claimed in claim 12 wherein said reset switch means is a thermostatic switch.

References Cited

UNITED STATES PATENTS

| | | | |
|---|---|---|---|
| 3,023,350 | 2/1962 | Broadley et al. | 318—476 X |
| 3,258,647 | 6/1966 | Clark | 317—40 |
| 3,262,017 | 7/1966 | Ashenden et al. | 317—33 |
| 3,317,791 | 5/1967 | Price et al. | 317—22 |

JOHN F. COUCH, *Primary Examiner.*

J. D. TRAMMELL, *Assistant Examiner.*

U.S. Cl. X.R.

317—22, 33, 36; 318—473, 476